United States Patent [19]

Clarke

[11] Patent Number: 4,591,102
[45] Date of Patent: May 27, 1986

[54] CHAFF SPREADER FOR COMBINE HARVESTER

[76] Inventor: James A. Clarke, Box 68, Rosetown, Saskatchewan, Canada, S0L 2V0

[21] Appl. No.: 642,364

[22] Filed: Aug. 20, 1984

[51] Int. Cl.$^4$ .................... A01C 15/04; A01C 17/00
[52] U.S. Cl. .................................. 239/655; 239/679; 239/682; 239/689
[58] Field of Search ............... 239/654, 655, 679, 681, 239/682, 687–689

[56] References Cited

U.S. PATENT DOCUMENTS

| | | | |
|---|---|---|---|
| 1,770,707 | 7/1930 | McDow | 239/654 X |
| 2,638,351 | 5/1953 | Stornetta et al. | 239/682 |
| 3,329,322 | 7/1967 | Herd | 239/689 X |
| 4,292,795 | 10/1981 | Linn | 130/26 X |

FOREIGN PATENT DOCUMENTS

| | | | |
|---|---|---|---|
| 6407872 | 1/1965 | Netherlands | 239/682 |
| 472855 | 10/1937 | United Kingdom | 239/654 |
| 748031 | 4/1956 | United Kingdom | 239/681 |

OTHER PUBLICATIONS

Reed, W. B., Paper Presented at 1980 60th Annual AIC Conference Canadian Society of Agricultural Engineering, Aug. 3–7, 1980.

Primary Examiner—Jeffrey V. Nase
Assistant Examiner—Mary Beth O. Jones
Attorney, Agent, or Firm—Stanley G. Ade

[57] ABSTRACT

Apparatus for spreading chaff includes brackets for mounting the apparatus beneath and rearwardly of the cleaning shoe of a combine or other grain threshing machine and separately of any straw chopping and spreading apparatus provided adjacent the straw discharge opening. The apparatus comprises a pair of fans rotatable in a horizontal plane above a base plate and upstanding walls defining housings around the fans and discharge nozzles extending to the sides of the apparatus to discharge the chaff from each fan in a sideward direction and to substantially prevent discharge of chaff rearwardly of the apparatus.

3 Claims, 4 Drawing Figures

4,591,102

CHAFF SPREADER FOR COMBINE HARVESTER

BACKGROUND OF THE INVENTION

This invention relates to an apparatus for spreading chaff discharged from a combine harvesting apparatus or similar grain threshing machine. Many combines include a cleaning shoe at which chaff is discharged at a position spaced from the discharge of straw. Many different types of apparatus have been proposed for use at the straw discharge of such a combine for chopping the straw and spreading it relative to the rear of the combine. One class of such straw spreaders includes rotating blades which act to chop the straw and at the time discharge it radially.

However, these apparatus are unsuitable for use in spreading chaff discharged from the cleaning shoe and have never been used in the area of the chaff discharge. Generally, chaff has been allowed to discharge directly behind the combine and attention has only been applied to the straw discharge with devices available to chop and spread the straw or to swath the straw for later collection.

SUMMARY OF THE INVENTION

It is one object of the invention therefore to provide a chaff spreading apparatus for a combine which is simple and can be readily fixed to a combine for spreading the chaff to either side of the combine.

The invention therefore according to one aspect provides a chaff spreading apparatus for a grain threshing machine having a cleaning shoe from which chaff is discharged, the apparatus comprising a housing in the form of a flat substantially horizontal plate and walls upstanding from the plate, means for attaching the housing to the threshing machine below the cleaning shoe to receive chaff therefrom, blade means, means mounting the blade means on the housing for rotation relative to the housing in a plane parallel thereto about an axis at right angles thereto to eject the chaff from the housing, an directional discharge means defined by said upstanding walls of the housing and arranged to diret the chaff from the housing to at least one side of the threshing machine.

It is one advantage of the invention that the apparatus allows chaff to be spread evenly across the field which reduces or eliminates the problems of uneven tillage depth and depth of seeding and the yellow strips of crop usually associated with stubble crops due to lack of nitrogen.

A further advantage of the invention is that there can be provided two fans each ejecting through a directional discharge nozzle to a respective side of the combine or grain threshing machine thus allowing the apparatus to spread the chaff to both sides of the machine over a wide area.

It is a yet further advantage of the invention that it can be used to spread the chaff independently of whether the straw is chopped and spread or is swathed and independently of whether apparatus for such use is provided on the combine.

It is a yet further advantage of the invention that the fans can include slightly curved blades which act to develop suction to draw the chaff into the blades for ejection radially of the blades. In view of the low speeds and low suction required the suction does not intefere with air currents within the combine and thus does not affect the efficiency or capacity of the combine.

It is a still further advantage of the invention that it comprises a simple flat base with housings defined around the fans and providing any directional discharge nozzles defined by upstanding walls from the flat base.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
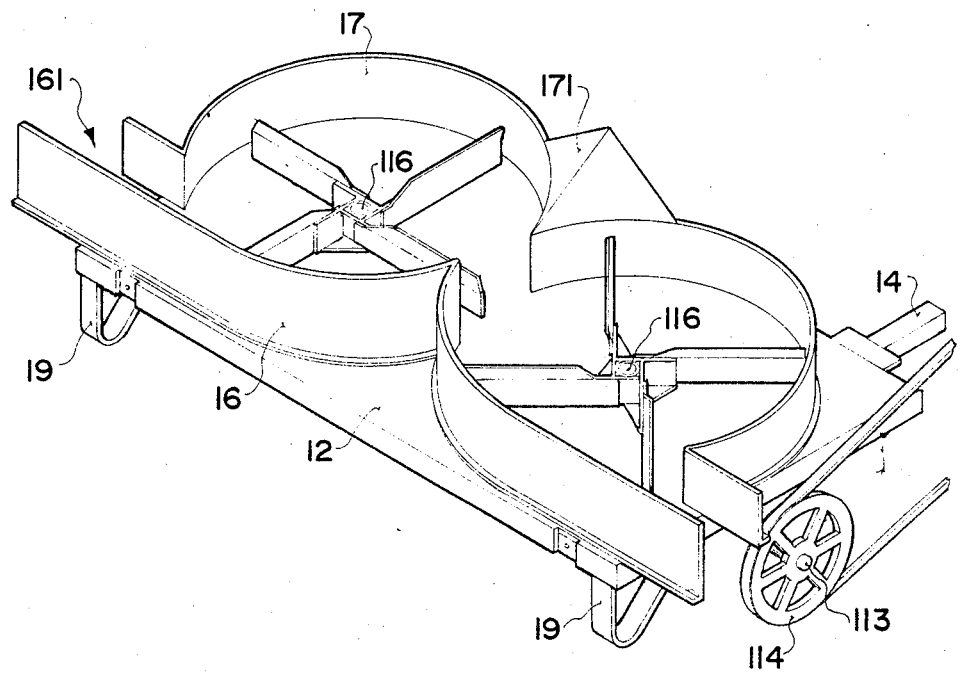
FIG. 1 is an isometric view of a chaff spreading apparatus according to the invention.
Figure 2:
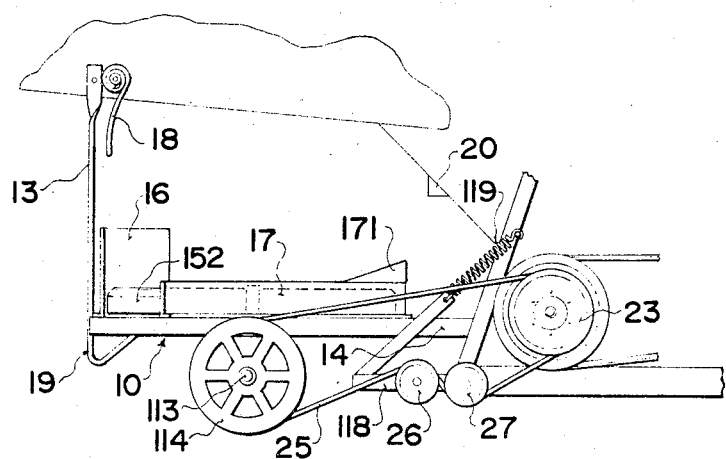
FIG. 2 is a side elevational view of the apparatus of FIG. 1 attached to a combine.
Figure 3:
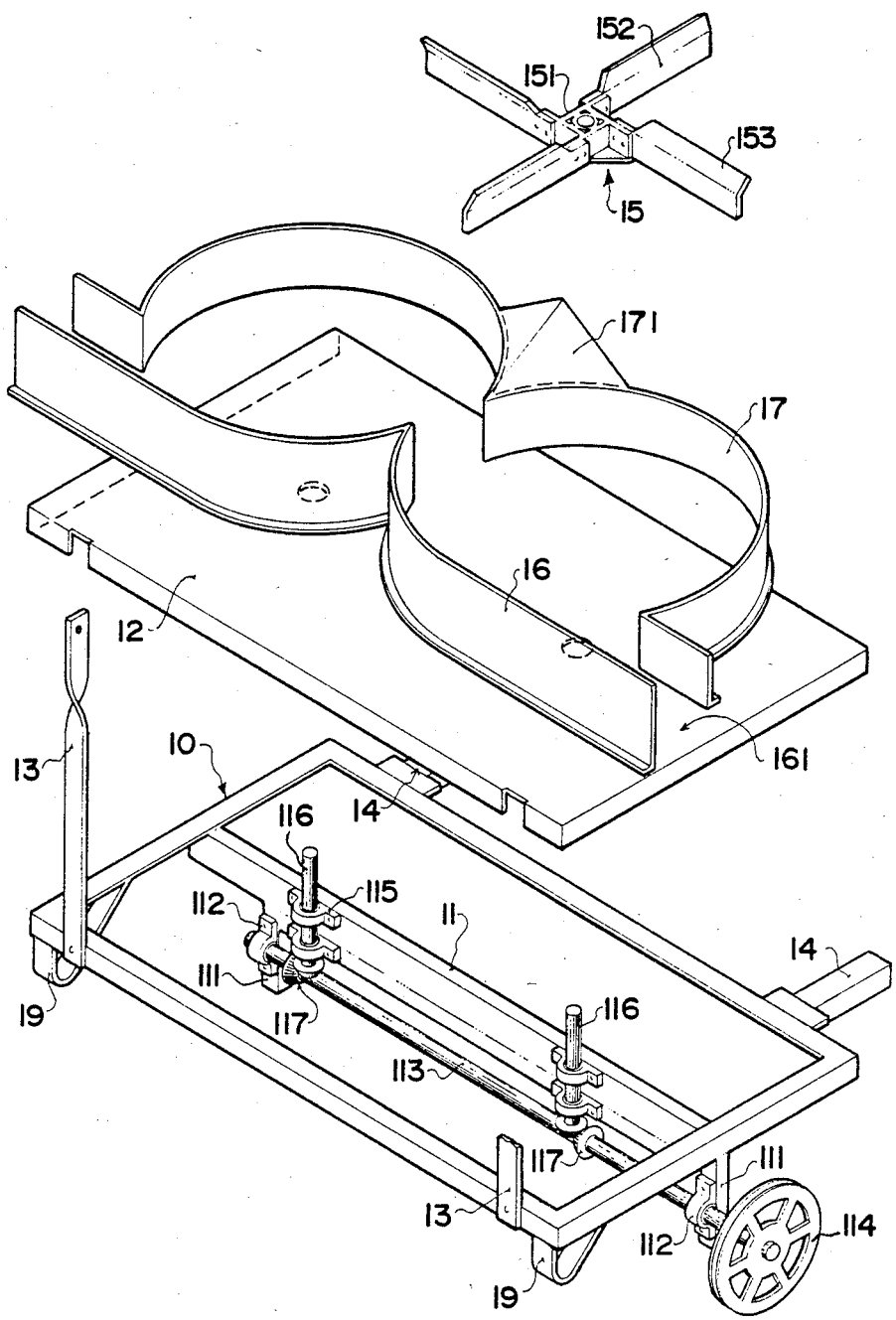
FIG. 3 is an exploded isometric view of the apparatus of FIG. 1.
Figure 4:
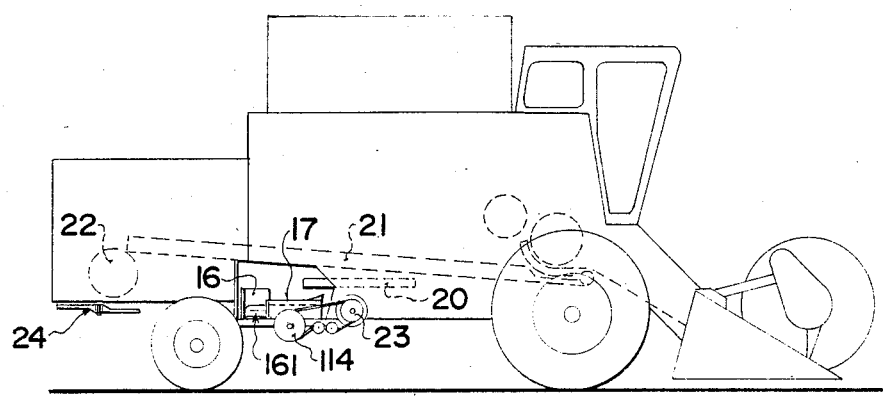
FIG. 4 is a schematic side elevation of a combine incorporating the apparatus.

Referring generally to FIGS. 1, 2 and 3, the chaff spreading apparatus comprises a frame 10 of welded angle iron, tubular steel or other suitable maaterial, forming a rectangular structure with a cross member 11 extending from one side to the other. On top of the frame 10 is supported a flat sheet 12 of mild steel with turned down edges to match the edges of the frame 10. Upstanding straps, hangers or supports 13 are provided at the rear edge of the frame 10 and forwardly extending tubular, angle iron or other suitable supports 14 are attached to the front edge of the frame 10 for supporting the apparatus on the combine as shown in FIGS. 2 and 4 and explained in further detail hereinafter.

The cross member 11 includes downwardly depending extensions 111 which provide bushings 112 for supporting a shaft 113 and pulley wheel 114. The shaft 113 extends horizontally with the pulley 114 projecting from one or both sides of the frame 10. The cross member 11 also carries bushings 115 which are arranged in two pairs so as to support axles 116 which extend vertically upwardly through holes provided in the plate 12. Cooperating bevel gears 117 are arranged to communicate drive from the pulley 114 through shaft 113 to the shafts 116 whereby they are driven in synchronism.

Upon each of the shafts 116 is mounted a fan 15 comprising a central casting 151 which surrounds the shaft 116 and incorporates means (not shown) for securing the casting to the shaft and portions extending mutually at right angles for supporting four blades 152. Each blade is secured to the casting by screws, bolts or rivets and extends straight out from the casting so that the four blades lie mutually at right angles. The upper surface 153 of each of the blades is bent forwardly out of the plane of the blade so that as the fan is rotated the portion 153 tends to devlop a downward suction with the air drawn into the fan ejected radially of the blades 152.

It will be noted that as viewed from the rear the lefthand shaft 116 rotates clockwise and the righthand shaft rotates counterclockwise in view of the arrangement of the bevel gears 117. The fan 15 are positioned on the shafts 116 such that the blades slightly intersect in their motion and such that they rotate slightly out of phase to avoid contact between the blades. In this way the blades sweep the upper surfaces of the plate 12 with no dead space between the blades.

A housing is defined around the fans 15 by two upstanding walls 16 and 17 each of which is formed by a curved sheet having a small flange at right angles and arranged at the base for securing the wall to the sheet 12. Generally the walls define two circular housings surrounding the tips of the blades 152 with a space intermediate the two fans 15 to allow the blades to intersect as explained previously. The rear wall 16 extends from the portion surrounding the respective fan 15 substantially tangentially to the fan so as to define one side of a directional discharge nozzle 161. The other side of the nozzle 161 is defined by a portion of the wall 17 parallel to the tangential portion of the wall 16 and extending outwardly from the circle defined by the tips of the blades 152. Each of the directional discharge nozzles 161, therefore, directs material or air carried by the fans 15 to the sides of the apparatus and prevents or substantially prevents material from being ejected forwardly or rearwardly of the apparatus.

As can be best seen from FIG. 2, the rear wall 16 is substantially higher than the front wall 17 and cooperates with a curtain 18 which extends downwardly from the body of the combine so that wall 16 and the curtain 18 act to confine chaff ejected from the combine and directed onto the fans 15 between the walls 16 and 17. This is aided by the suction developed by the fans 15. A triangular upstanding portion 171 bridges the portion on the wall 17 between the two fans so as to direct material falling outisde the scope of the fan blades into the fan blades.

A pair of bumper straps 19 is provided on the frame 10 depending from the rear of the sides to provide protection for the apparatus both in use and during transport.

In use of the apparatus and as shown in FIGS. 2 and 4, the apparatus is attached by the straps, hangers or supports 13 and by the member 14 to the body of the combine. The straps, hangers or supports 13 are attached to the body in the area beneath the straw walkers and the members 14 are attached at the rear of the cleaning shoe area so that the fan housings and fans are positioned generally rearwardly and beneath the outlet of the cleaning shoe schematically indicated at 20. The straw walkers are schematically indicated at 21 with a straw chopping device indicated schematically at 22. The remainder of the combine shown in FIG. 4 will not be described as it is of conventional construction.

The pulley 114 is driven via a belt 25 by a pulley 23 mounted upon the return (tailings) augar shaft. Tensioning of the belt 25 is provided by a pair of pulleys 26, 27 with the latter mounted on the frame of the combine adjacent the auger and with the former mounted upon a strap 118 pivotally mounted relative to the pulley 117 and biased in a belt tensioning direction by a spring 119. The sizes of the pulleys 114 and 23 are chosen such that the fans 15 are driven at a speed of the order of 250 rpm. This relatively slow speed provides sufficient suction to draw chaff discharges from the cleaning shoe 20 into the fans 15 while avoiding excessive air streams which interfere with the air streams within the combine and thus with the separation of the chaff from the grain. The rear wall 16, the curtain 18 and the front wall 17 coact to direct most of the chaff discharged from the shoe 20 into the fans 15 from which position the chaff is directed radially of the fan blades through the direction discharge nozzles 161 and thus to the sides of the spreader apparatus. The apparatus effectively prevents chaff from discharging rearwardly of the shoe 20 to ensure a even spread of the chaff across the field from the discharge nozzles 161.

The drive for the pulley 114 may in an alternative arrangment (not shown) be taken from the rear straw walker crank with suitable belt tensioning arrangement being provided similar to that shown. In either arrangment the drive to the chaff spreader apparatus is independent of the drive to the straw chopper 22 and to the drive to a straw spreader apparatus schematically indicated at 23. In this way the chaff can be spread independently of the requirement of the operative to chop and spread the straw or to swath the straw.

In order to accommodate different processing conditions of the combine, the mounting brackets 13 and 14 may be provided with means (not shown) for adjustably mounting the apparatus on the body of the combine so that the position of the fans relative to the discharge of the shoe 20 can be adjusted to maximize the collection and spreading of the chaff.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A chaff spreading apparatus for a combine movable over ground having a crop thereon in the direction of travel and having a cleaning shoe from which chaff is discharged, the apparatus comprising a housing in the form of a flat substantially horizontal base member having a front edge, a rear edge and two sides and wall means upstanding from the base member, said housing being completely open above said base member for deposit of chaff thereon, means for attaching the housing to the combine below and rearwardly of the cleaning shoe to receive chaff therefrom, a pair of fans each including blade means, means mounting each of the fans on the base member for rotation relative to the base member in a plane parallel thereto about a respective axis at right angles thereto to eject chaff from the housing, said axes of said respective fans being spaced transversely to the direction of travel, each of said fans sweeping a circle wholly lying on the base member, said upstanding wall means defining a rear wall along the rear edge of the base member and a front wall along the front edge of the base member, said rear wall including a forwardly projecting V-shape defined by two part circular portions intesecting between said fans and arranged to closely follow the circles swept by said fans and two tangential portions projecting outwardly from said part circular portions at right angles to the directional of travel to respective sides of said base member, said front wall including a rearwardly projecting V-shape defined by two part circular portions intersecting between said fans and arranged to closely follow the circles swept by said fans and two outwardly projecting portions each substantially parallel to a respective one of said tangential portions of said rear wall and spaced therefrom to define a directional discharge nozzle confining the ejection of the chaff solely to respective sides of the base member, said rear wall having a greater height from said base member than said front wall.

2. A chaff spreading apparatus for a combine movable over ground having a crop thereon in the direction of travel and having a cleaning shoe from which chaff is discharged, the apparatus comprising a housing in the form of a flat substantially horizontal base member having a front edge, a rear edge and two sides and wall means upstanding from the base member for deposit of chaff thereon, means for attaching the housing to the combine below and rearwardly of the cleaning shoe to receive chaff therefrom, a pair of fans each including blade means, means mounting each of the fans on the base member for rotation relative to the base member in a plane parallel thereto about a respective axis at right angles thereto to eject chaff from the housing, said axes of said respective fans being spaced transversely to the direction of travel, each of said fans sweeping a circle wholly lying on the base member, said upstanding wall means defining a rear wall along the rear edge of the base member and a front wall along the front edge of the base member, said rear wall including a forwardly projecting V-shape defined by two part circular portions intersecting between said fans and arranged to closely follow the circles swept by said fans and two tangential portions projecting outwardly from said part circular portions at right angles to the direction of travel to respecsides of said base member, said front wall including a rearwardly projecting V-shape defined by two part circular portions intersecting between said fans and arranged to closely follow the circles swept by said fans and two outwardly projecting portions each substantially parallel to a respective one of said tangential portions of said rear wall and spaced therefrom to define a directional discharge nozzle confining the ejection of the chaff solely to respective sides of the base member, said rear wall having a greater height from said base member than said front wall, each of said fans comprising a plurality of blade means, each blade means comprising an upstanding substantially vertical portion having a lower linear edge thereof immediately adjacent and sweeping directly over the base member and a forwardly inclined portion at an upper edge of said vertical portion whereby an airstream generate by said forwardly inclined portion is drawn downwardly into said fan means and acts to sweep said base member prior to ejection thereof with said chaff through a respective one of said direction discharge nozzles.

3. Apparatus according to claim 2 wherein the fans are arranged on said base member such that the circles swept thereby intersect and wherein the blade means of one fan are arranged out of phase with those of the other fan to avoid contact between the fans as they rotate.

* * * * *